United States Patent
Jung et al.

(10) Patent No.: US 8,971,001 B2
(45) Date of Patent: Mar. 3, 2015

(54) OVERVOLTAGE PROTECTION CIRCUIT

(71) Applicant: TLI Inc., Seongnam-si, Gyeonggi-do (KR)

(72) Inventors: Tae Ho Jung, Seongnam-si (KR); Jung Woo Lee, Yongin-si (KR)

(73) Assignee: Sensonia Inc., Seongnam-Si, Gyeonggi-Do (KR)

( * ) Notice: Subject to any disclaimer, the term of this patent is extended or adjusted under 35 U.S.C. 154(b) by 215 days.

(21) Appl. No.: 13/861,949

(22) Filed: Apr. 12, 2013

(65) Prior Publication Data

US 2013/0308236 A1 Nov. 21, 2013

(30) Foreign Application Priority Data

May 15, 2012 (KR) ........................ 10-2012-0051343

(51) Int. Cl.
- *H02H 3/20* (2006.01)
- *H02H 9/04* (2006.01)
- *H02H 1/04* (2006.01)

(52) U.S. Cl.
CPC . *H02H 3/20* (2013.01); *H02H 9/04* (2013.01); *H02H 1/04* (2013.01); *H02H 3/202* (2013.01)
USPC ...................................................... 361/91.1

(58) Field of Classification Search
CPC ............ H02H 3/20; H02H 3/202; H02H 9/04
See application file for complete search history.

(56) References Cited

U.S. PATENT DOCUMENTS

| 5,449,984 | A | * | 9/1995 | Sawdon et al. | 315/386 |
| 5,539,299 | A | * | 7/1996 | Fernandez et al. | 320/163 |
| 5,659,154 | A | * | 8/1997 | Yoshikawa | 178/18.05 |
| 5,847,544 | A | * | 12/1998 | Eguchi | 320/136 |
| 7,279,956 | B2 | * | 10/2007 | Caplan et al. | 327/536 |
| 7,821,233 | B2 | * | 10/2010 | Nate et al. | 320/134 |
| 8,144,444 | B2 | * | 3/2012 | Horsky et al. | 361/111 |

FOREIGN PATENT DOCUMENTS

| KR | 20-0335374 | 12/2003 |
| KR | 10-2006-0077556 | 7/2006 |
| KR | 10-0636526 | 10/2006 |
| KR | 10-2008-0021254 | 3/2008 |
| KR | 10-0809688 | 3/2008 |
| KR | 10-1079945 | 11/2011 |

* cited by examiner

*Primary Examiner* — Zeev V Kitov

(74) *Attorney, Agent, or Firm* — Kile Park Reed & Houtteman PLLC

(57) ABSTRACT

In general terms, embodiments of the present invention relate to an overvoltage protection circuit. In some embodiments, the overvoltage protection circuit includes: (a) an input receiving node configured to receive an input voltage; (b) an input transmitting node; (c) an input switch formed between the input receiving node and the input transmitting node, and configured to selectively electrically connect the input receiving node to the input transmitting node based on a switch control signal, where the input switch is configured to cut off an electrical connection between the input receiving node and the input transmitting node when the switch control signal is in an inactive state (e.g., a logic low state "L"); and (d) a control signal generation block configured to sense a transmission voltage of the input transmitting node and generate the switch control signal in the inactive state when the transmission voltage rises to a reference voltage or higher.

7 Claims, 4 Drawing Sheets

OVERVOLTAGE PROTECTION CIRCUIT

CROSS-REFERENCE TO RELATED APPLICATION

This application claims priority to and the benefit of Korean Patent Application No. 2012-0051343, filed on May 15, 2012, the disclosure of which is incorporated herein by reference in its entirety.

BACKGROUND

1. Field

Embodiments of the present invention relate to an overvoltage protection circuit, and more particularly, to an overvoltage protection circuit that prevents inflow of an overvoltage to a main circuit from the outside of the main circuit.

2. Discussion of Related Art

With an increase in the use of various electrical and electronic devices, an applied input voltage frequently becomes an overvoltage due to a noise generated from the outside. Such an inflow of an overvoltage may damage a main circuit in electronic equipment.

Thus, an overvoltage protection circuit is needed to effectively prevent the inflow of an overvoltage to the main circuit from the outside of the main circuit.

SUMMARY OF SELECTED EMBODIMENTS OF THE INVENTION

Embodiments of the present invention are directed to providing an overvoltage protection circuit capable of effectively preventing an overvoltage generated from the outside from flowing into a main circuit.

According to some embodiments of the present invention, there is provided an overvoltage protection circuit, including: (a) an input receiving node configured to receive an input voltage; (b) an input transmitting node; (c) an input switch formed between the input receiving node and the input transmitting node, and configured to selectively electrically connect the input receiving node to the input transmitting node based on a switch control signal, where the input switch is configured to cut off an electrical connection between the input receiving node and the input transmitting node when the switch control signal is in an inactive state (e.g., a logic low state "L") ; and (d) a control signal generation block configured to sense a transmission voltage of the input transmitting node and generate the switch control signal in the inactive state when the transmission voltage rises to a reference voltage or higher.

In some embodiments, the control signal generation block includes: (a) a feedback signal generator configured to sense the transmission voltage and generate a feedback signal that is in an inactive state (e.g., a logic low state "L") when the transmission voltage rises to the reference voltage or higher; and (b) a control signal generator configured to generate the switch control signal in the inactive state when the feedback signal is in the inactive state. Also, in some embodiments, the feedback signal generator includes: (a) a comparison unit configured to compare a drive voltage with the reference voltage and generate the feedback signal; and (b) an active switch configured to couple the drive voltage with the transmission voltage when an active signal is in an active state (e.g., a logic high state "H"), and couple the drive voltage with a fixed power supply when the active signal is in an inactive state (e.g., a logic low state "L").

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The above as well as additional purposes, features, and advantages of the disclosed technology will become apparent in the following exemplary embodiments and accompanying drawings. However, the disclosed technology is not limited to the exemplary embodiments disclosed below but can be implemented in various forms. These exemplary embodiments are provided so that this disclosure will be thorough and complete, and will fully convey the scope of this disclosure to those of ordinary skill in the art.

(First Exemplary Embodiment)

Figure 1:
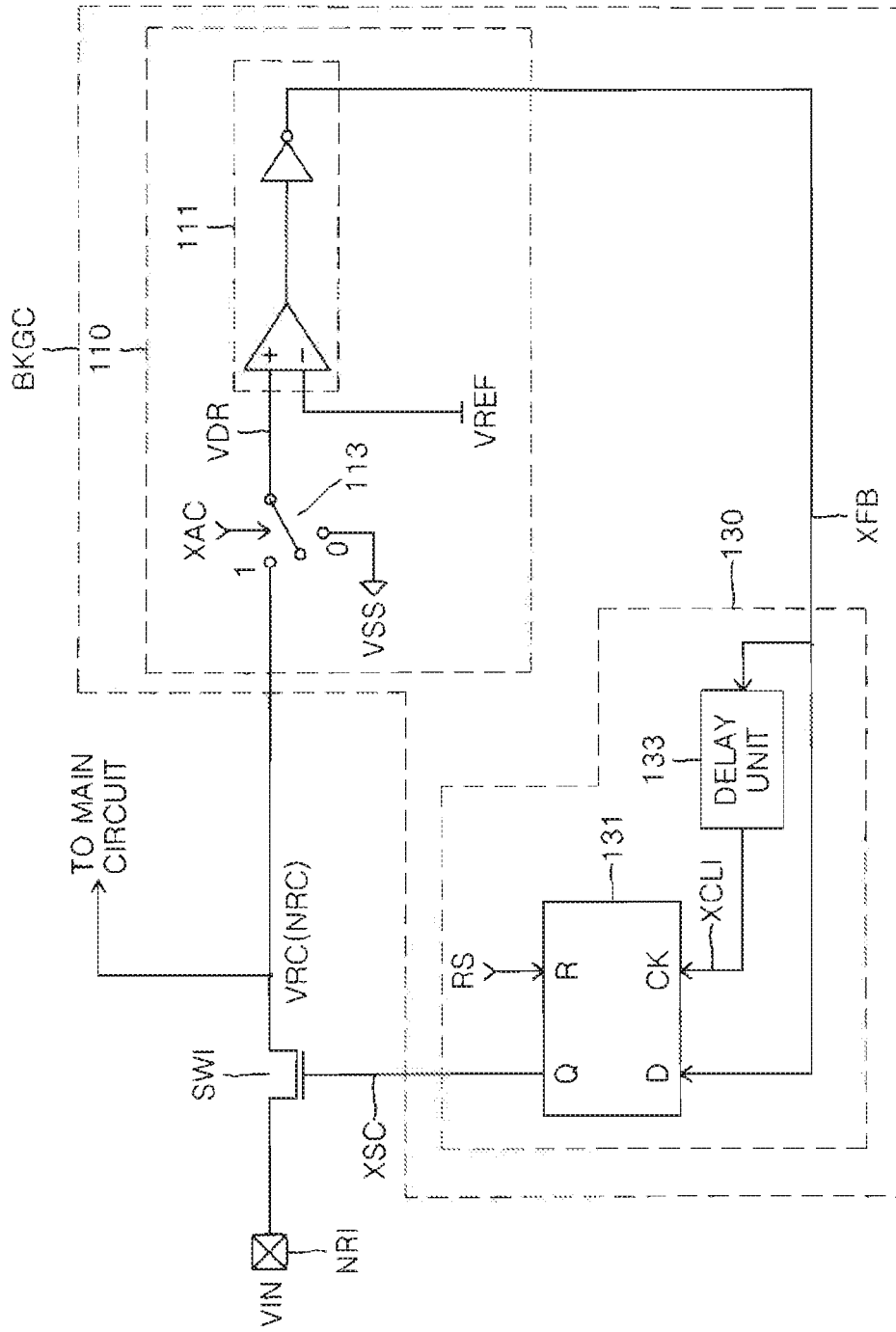
FIG. 1 is a diagram showing an overvoltage protection circuit according to a first exemplary embodiment of the present invention.

FIG. 1 is a diagram showing an overvoltage protection circuit according to a first exemplary embodiment of the present invention. Referring to FIG. 1, the overvoltage protection circuit according to the first exemplary embodiment includes an input receiving node NRI, an input transmitting node NRC, an input switch SWI, and a control signal generation block BKGC.

The input receiving node NRI receives an input voltage VIN. The input transmitting node NRC has a transmission voltage VRC that is transferred to an internal main circuit. In this specification, a "main circuit" means a "circuit to be protected."

The input switch SWI is formed between the input receiving node NRI and the input transmitting node NRC. When a switch control signal XSC is in an active state (e.g., in a logic high state "H"), the switch SWI electrically connects the input receiving node NRI with the input transmitting node NRC. At this time, the transmission voltage VRC is near to the input voltage VIN.

On the other hand, when the switch control signal XSC is in an inactive state (e.g., in a logic low state "L"), the switch SWI is operated so that the electrical connection between the input receiving node NRI and the input transmitting node NRC is cut off.

In this exemplary embodiment, the input switch SWI is an n-channel metal oxide semiconductor (NMOS) transistor of which two junctions are connected with the input receiving node NRI and the input transmitting node NRC respectively and gated according to the switch control signal XSC.

The control signal generation block BKGC senses the transmission voltage VRC and generates the switch control signal XSC. For example, in some embodiments, the control signal generation block BKGC is configured to generate the switch control signal XSC in the inactive state "L" when the transmission voltage VRC rises to a reference voltage VREF or higher.

The control signal generation block BKGC includes a feedback signal generator 110 and a control signal generator 130.

The feedback signal generator 110 senses the transmission voltage VRC and generates a feedback signal XFB. For example, in some embodiments, the feedback signal generator 110 is configured to generate the feedback signal XFB in an inactive state (e.g., a logic low state "L") when the transmission voltage VRC rises to the reference voltage VREF or higher.

In some embodiments, such as the one shown in FIG. 1, the feedback signal generator 110 includes a comparison unit 111. The comparison unit 111 compares a drive voltage VDR with the reference voltage VREF and generates the feedback signal XFB based thereon. In some embodiments, the drive voltage VDR is controlled to have a level according to the transmission voltage VRC.

In the exemplary embodiment of FIG. 1, the comparison unit 111 receives the drive voltage VDR through a non-inverted input terminal + and the reference voltage VREF through an inverted input terminal −. In some embodiments, the feedback signal XFB is deactivated to the inactive state "L" when the drive voltage VDR, that is, the transmission voltage VRC, rises to the reference voltage VREF or higher.

In some embodiments, such as the one shown in FIG. 1, the feedback signal generator 110 further includes an active switch 113. The active switch 113 couples the drive voltage VDR with the transmission voltage VRC when an active signal XAC is in an active state (e.g., a logic high state "H"). For example, in some embodiments, the active switch 113 is configured to electrically connect the drive voltage VDR with the transmission voltage VRC in an operation mode in which the active signal XAC is activated to the active state "H." In this operation mode, the transmission voltage VRC is transferred to the drive voltage VDR.

In addition, the active switch 113 couples the drive voltage VDR with a fixed power supply (in this exemplary embodiment, a ground voltage VSS) when the active signal XAC is in an inactive state (e.g., a logic low state "L"). For example, in some embodiments, the active switch 113 is configured to control the drive voltage VDR through the ground voltage VSS in a standby mode in which the active signal XAC is deactivated to the inactive state "L." Thus, in the standby mode, the inverted input terminal—of the comparison unit 111 is prevented from being floated. Still referring to FIG. 1, the control signal generator 130 generates the switch control signal XSC. In some embodiments, the switch control signal XSC is deactivated to the inactive state "L" when the feedback signal XFB is deactivated to the inactive state "L."

The control signal generator 130 includes a signal control unit 131. The signal control unit 131 generates the switch control signal XSC that is controlled to be deactivated to the inactive state "L" when the feedback signal XFB is deactivated to the inactive state "L."

In some embodiments, the signal control unit 131 is implemented as a flip-flop that receives the feedback signal XFB through a data input terminal D, provides the switch control signal XSC through an output terminal Q, receives a clock signal XCLI through a clock terminal CK, and receives a reset pulse RS through a reset terminal R.

In some embodiments, as shown in FIG. 1, the clock signal XCLI is generated based on the feedback signal XFB.

In the exemplary embodiment in which the clock signal XCLI is generated based on the feedback signal XFB, the number of applied external signals is reduced, and the circuit has a relatively simple configuration, compared to a case in which an additional signal is provided from the outside to the clock terminal CK of the flip-flop.

For example, in some embodiments in which the clock signal XCLI is generated based on the feedback signal XFB, the control signal generator 130 further includes a delay unit 133. In such embodiments, the delay unit 133 delays the feedback signal XFB to generate the clock signal XCLI.

Accordingly, in the first exemplary embodiment of the present invention, the clock signal XCLI applied to the clock terminal CK is delayed compared to the feedback signal XFB applied to the data input terminal D of the flip-flop. As such, even when a noise occurs in the feedback signal XFB, a point in time at which the noise occurs in the feedback signal XFB does not overlap a point in time at which the noise occurs in the clock signal XCLI, and thus the probability of malfunction of the overvoltage protection circuit according to the first exemplary embodiment of the present invention is significantly reduced.

Figure 2:
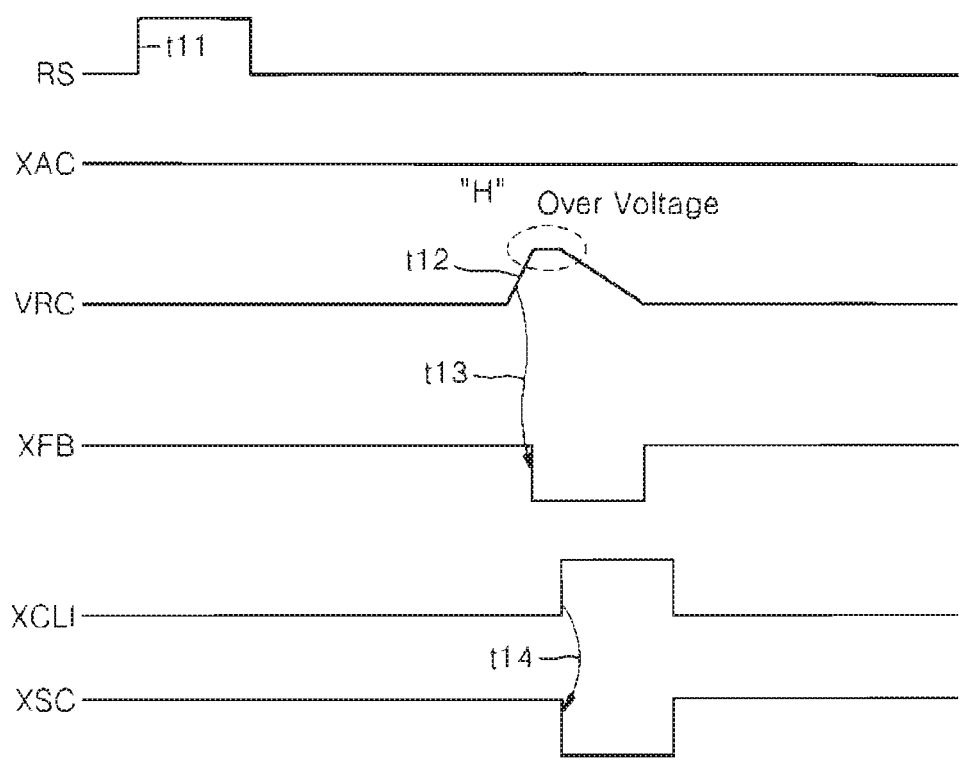
FIG. 2 is a timing diagram illustrating operation of the overvoltage protection circuit according to the first exemplary embodiment of FIG. 1.

FIG. 2 is a timing diagram illustrating operation of the overvoltage protection circuit according to the first exemplary embodiment of FIG. 1. Referring to FIG. 2, at a point in time t11, the reset pulse RS is generated.

Subsequently, when the input voltage VIN that is an overvoltage is received, the overvoltage is generated as the transmission voltage VRC (see t12).

Thus, the feedback signal XFB is deactivated to the inactive state "L" (see t13). In response to the clock signal XCLI generated thereafter, the switch control signal XSC is deactivated to the inactive state "L" (see t14).

As a result, the input switch SWI is "turned off," and the connection between the transmission voltage VRC and the input voltage VIN that is the overvoltage is cut off.

In the overvoltage protection circuit according to the first exemplary embodiment of the present invention as described above, when an overvoltage is generated in the external input voltage VIN, the input switch SWI is turned off. Thus, inflow of the input voltage VIN to the transmission voltage VRC is cut off.

Consequently, the overvoltage protection circuit according to the first exemplary embodiment of the present invention can effectively prevent an overvoltage generated from the outside from flowing into a main circuit.

(Second Exemplary Embodiment)

Figure 3:
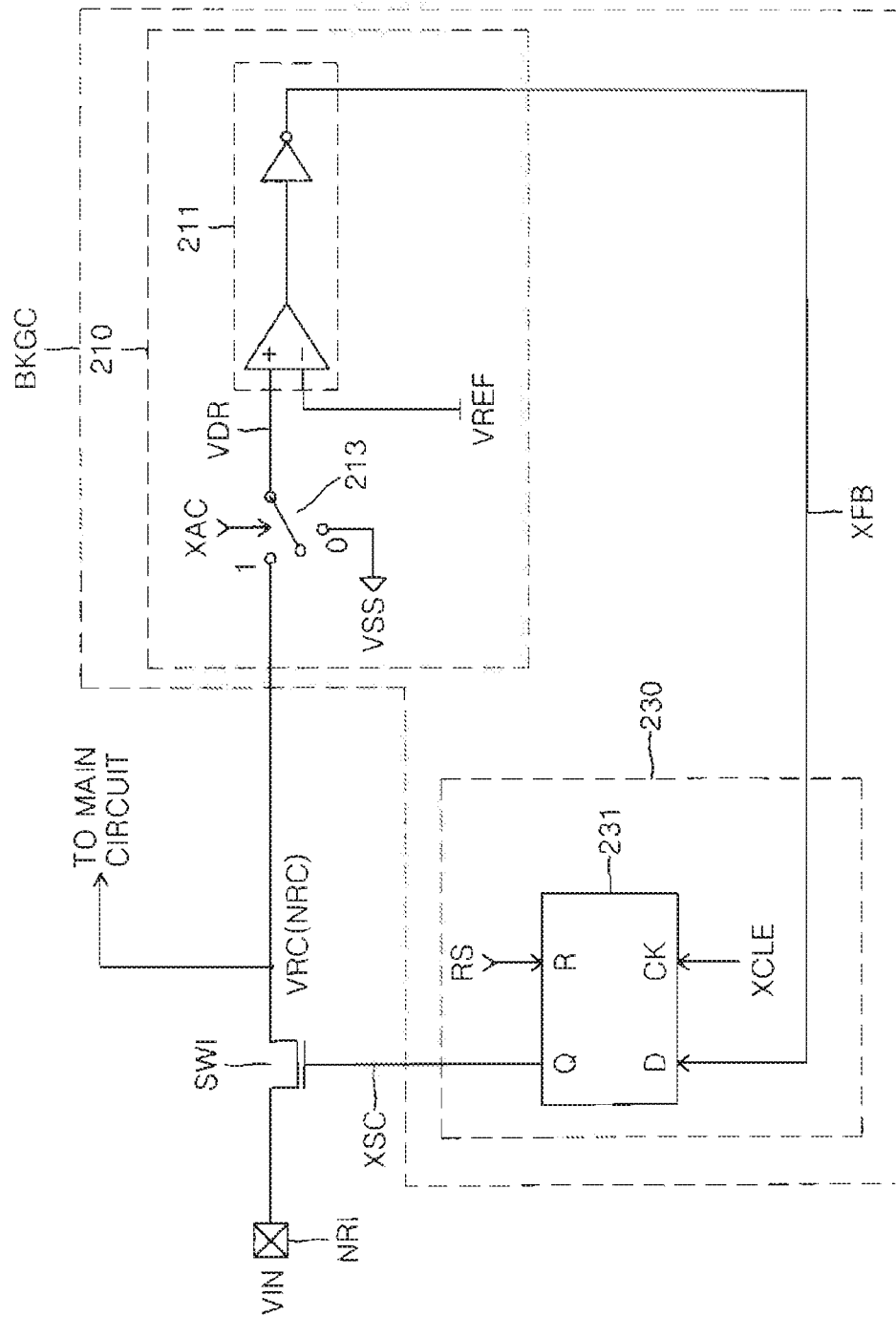
FIG. 3 is a diagram showing an overvoltage protection circuit according to a second exemplary embodiment of the present invention.

FIG. 3 is a diagram showing an overvoltage protection circuit according to a second exemplary embodiment of the present invention. Referring to FIG. 3, the overvoltage protection circuit according to the second exemplary embodiment includes an input receiving node NRI, an input transmitting node NRC, an input switch SWI, and a control signal generation block BKGC.

The input receiving node NRI receives an input voltage VIN. The input transmitting node NRC has a transmission voltage VRC that is transferred to an internal main circuit.

The input switch SWI is formed between the input receiving node NRI and the input transmitting node NRC. When a switch control signal XSC is in an active state (e.g., a logic high state "H"), the switch SWI electrically connects the input receiving node NRI with the input transmitting node NRC. At this time, the transmission voltage VRC is near to the input voltage VIN.

On the other hand, when the switch control signal XSC is in an inactive state (e.g., a logic low state "L"), the switch SWI is operated so that the electrical connection between the input receiving node NRI and the input transmitting node NRC is cut off.

In this exemplary embodiment, the input switch SWI is an n-channel metal oxide semiconductor (NMOS) transistor of which two junctions are connected with the input receiving node NRI and the input transmitting node NRC respectively and gated according to the switch control signal XSC.

The control signal generation block BKGC senses the transmission voltage VRC and generates the switch control signal XSC. For example, in some embodiments, the control signal generation block BKGC is configured to generate the switch control signal XSC in the inactive state "L" when the transmission voltage VRC rises to a reference voltage VREF or higher.

The control signal generation block BKGC includes a feedback signal generator 210 and a control signal generator 230.

The feedback signal generator 210 senses the transmission voltage VRC and generates a feedback signal XFB. For example, in some embodiments, the feedback signal generator 210 is configured to generate the feedback signal XFB in an inactive state (e.g., a logic low state "L") when the transmission voltage VRC rises to the reference voltage VREF or higher.

In some embodiments, the feedback signal generator 210 includes a comparison unit 211. The comparison unit 211 compares a drive voltage VDR with the reference voltage VREF and generates the feedback signal XFB based thereon. In some embodiments, the drive voltage VDR is controlled to have a level according to the transmission voltage VRC.

In the exemplary embodiment of FIG. 3, the comparison unit 211 receives the drive voltage VDR through a non-inverted input terminal + and the reference voltage VREF through an inverted input terminal −. In some embodiments, the feedback signal XFB is deactivated to the inactive state "L" when the drive voltage VDR, that is, the transmission voltage VRC, rises to the reference voltage VREF or higher.

In some embodiments, the feedback signal generator 210 further includes an active switch 213. The active switch 213 couples the drive voltage VDR with the transmission voltage VRC when an active signal XAC is in an active state (e.g., a logic high state "H"). For example, in some embodiments, the active switch 213 is configured to electrically connect the drive voltage VDR with the transmission voltage VRC in an operation mode in which the active signal XAC is activated to the active state "H." In this operation mode, the transmission voltage VRC is transferred to the drive voltage VDR.

In addition, the active switch 213 couples the drive voltage VDR with a fixed power supply (in this exemplary embodiment, a ground voltage VSS) when the active signal XAC is in an inactive state (e.g., a logic low state "L"). For example, in some embodiments, the active switch 213 is configured to control the drive voltage VDR through the ground voltage VSS in a standby mode in which the active signal XAC is deactivated to the inactive state "L." Thus, in the standby mode, the inverted input terminal—of the comparison unit 211 is prevented from being floated.

Still referring to FIG. 3, the control signal generator 230 generates the switch control signal XSC. For example, in some embodiments, the control signal generator 210 is configured to generate the switch control signal XSC in the inactive state "L" when the feedback signal XFB is deactivated to the inactive state "L."

The control signal generator 230 includes a signal control unit 231. In some embodiments, the signal control unit 231 generates the switch control signal XSC that is controlled to be deactivated to the inactive state "L" when the feedback signal XFB is deactivated to the inactive state "L."

In some embodiments, the signal control unit 231 is implemented as a flip-flop that receives the feedback signal XFB through a data input terminal D, provides the switch control signal XSC through an output terminal Q, receives a clock signal XCLE through a clock terminal CK, and receives a reset pulse RS through a reset terminal R.

Figure 4:
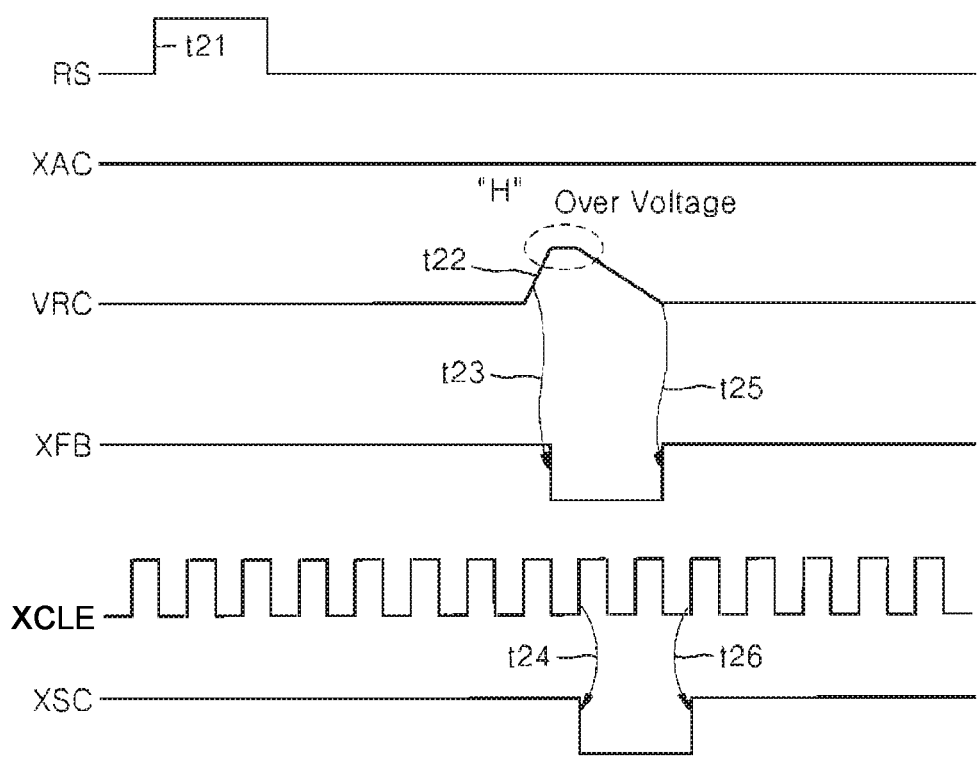
FIG. 4 is a timing diagram illustrating operation of the overvoltage protection circuit according to the second exemplary embodiment of FIG. 3.

FIG. 4 is a timing diagram illustrating operation of the overvoltage protection circuit according to the second exemplary embodiment of FIG. 3. Referring to FIG. 4, at a point in time t21, the reset pulse RS is generated.

Subsequently, when the input voltage VIN that is an overvoltage is received, the overvoltage is generated as the transmission voltage VRC (see t22).

Thus, the feedback signal XFB is deactivated to the inactive state "L" (see t23). In response to the clock signal XCLE generated thereafter, the switch control signal XSC is deactivated to the inactive state "L" (see t24).

As a result, the input switch SWI is "turned off," and the connection between the transmission voltage VRC and the input voltage VIN that is the overvoltage is cut off.

Subsequently, when the transmission voltage VRC escapes from the state of overvoltage, the feedback signal XFB is again activated to the active state "H" (see t25). In response to the clock signal XCLE generated thereafter, the switch control signal XSC is again activated to the active state "H" (see t26).

Then, the input switch SWI is again "turned on," and the input voltage VIN is transferred to the transmission voltage VRC.

In the overvoltage protection circuit according to the second exemplary embodiment of the present invention as described above, when an overvoltage is generated in the external input voltage VIN, the input switch SWI is turned off. Thus, inflow of the input voltage VIN to the transmission voltage VRC is cut off.

Consequently, the overvoltage protection circuit according to the second exemplary embodiment of the present invention can effectively prevent an overvoltage generated from the outside from flowing into a main circuit.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An overvoltage protection circuit, comprising:
an input receiving node configured to receive an input voltage;
an input transmitting node;
an input switch formed between the input receiving node and the input transmitting node, and configured to selectively electrically connect the input receiving node to the input transmitting node based on a switch control signal, wherein the input switch is configured to cut off an electrical connection between the input receiving node and the input transmitting node when the switch control signal is in an inactive state; and
a control signal generation block configured to sense a transmission voltage of the input transmitting node and generate the switch control signal in the inactive state when the transmission voltage rises to a reference voltage or higher,
wherein the control signal generation block comprises:
a feedback signal generator configured to sense the transmission voltage and generate a feedback signal that is in an inactive state when the transmission voltage rises to the reference voltage or higher; and
a control signal generator configured to generate the switch control signal in the inactive state when the feedback signal is in the inactive state, and the feedback signal generator comprises:
a comparison unit configured to compare a drive voltage with the reference voltage and generate the feedback signal; and
an active switch configured to couple the drive voltage with the transmission voltage when an active signal is in an active state, and couple the drive voltage with a fixed power supply when the active signal is in an inactive state.

2. The overvoltage protection circuit of claim 1, wherein the control signal generator comprises a signal control unit configured to generate the switch control signal that is controlled to be in the inactive state when the feedback signal is in the inactive state in response to a clock signal.

3. The overvoltage protection circuit of claim 2, wherein the signal control unit comprises a flip-flop of which a data input terminal is coupled with the feedback signal, and which provides the switch control signal through an output terminal and receives the clock signal through a clock terminal.

4. The overvoltage protection circuit of claim 3, wherein the control signal generator further comprises a delay unit configured to generate the clock signal by delaying the feedback signal.

5. The overvoltage protection circuit of claim 2, wherein the control signal generator further comprises a delay unit configured to generate the clock signal by delaying the feedback signal.

6. An overvoltage protection circuit, comprising:
an input receiving node configured to receive an input voltage;
an input transmitting node;
an input switch formed between the input receiving node and the input transmitting node, and configured to selectively electrically connect the input receiving node to the input transmitting node based on a switch control signal, wherein the input switch is configured to cut off an electrical connection between the input receiving node and the input transmitting node when the switch control signal is in an inactive state; and a control signal generation block configured to sense a transmission voltage of the input transmitting node and generate the switch control signal in the inactive state when the transmission voltage rises to a reference voltage or higher, wherein the control signal generation block comprises:
a feedback signal generator configured to sense the transmission voltage and generate a feedback signal that is in an inactive state when the transmission voltage rises to the reference voltage or higher; and
a control signal generator configured to generate the switch control signal in the inactive state when the feedback signal is in the inactive state, and the feedback signal generator comprises:
a comparison unit configured to compare a drive voltage with the reference voltage and generate the feedback signal; and
an active switch configured to couple the drive voltage with the transmission voltage when an active signal is in an active state, and couple the drive voltage with a fixed power supply when the active signal is in an inactive state, wherein the control signal generator comprises:
a flip-flop of which a data input terminal is coupled with the feedback signal, and which provides the switch control signal through an output terminal and receives a clock signal coupled to the feedback signal through a clock terminal.

7. The overvoltage protection circuit of claim 6, wherein the control signal generator further comprises a delay unit configured to generate the clock signal by delaying the feedback signal.

* * * * *